(12) United States Patent
Ould-Brahim et al.

(10) Patent No.: US 7,440,438 B2
(45) Date of Patent: Oct. 21, 2008

(54) REFRESH AND FILTERING MECHANISMS FOR LDP BASED VPLS AND L2VPN SOLUTIONS

(75) Inventors: Hamid Ould-Brahim, Kanata (CA); Peter Ashwood-Smith, Gatineau (CA); Donald Fedyk, Groton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 560 days.

(21) Appl. No.: 10/885,212

(22) Filed: Jul. 6, 2004

(65) Prior Publication Data

US 2005/0089047 A1    Apr. 28, 2005

Related U.S. Application Data

(60) Provisional application No. 60/514,463, filed on Oct. 24, 2003.

(51) Int. Cl.
*H04B 7/208* (2006.01)
*H04Q 7/00* (2006.01)
*G06F 15/173* (2006.01)

(52) U.S. Cl. ...................................... 370/344; 709/225

(58) Field of Classification Search ................. 370/328, 370/331, 338, 390–395.53, 400, 468; 709/203, 709/225, 227, 249
See application file for complete search history.

(56) References Cited

U.S. PATENT DOCUMENTS 6,744,739 B2 *   6/2004   Martin ........................ 370/254

7,136,374 B1 *   11/2006   Kompella ................... 370/352
2002/0126667 A1 *   9/2002   Oguchi ........................ 370/389
2005/0044262 A1 *   2/2005   Luo ............................ 709/238

OTHER PUBLICATIONS

Rosen et al, "Provisioning Models and Endpoint Identifiers in L2VPN Signaling", draft-ietf-l2vpn-signaling-00.txt, Sep. 2003, IETF Draft, Network Working Group.
Lasserre et al, "Virtual Private LAN Services over MPLS", draft-ietf-l2vpn-vpls-ldp-00.txt, Jun. 2003, IETF Draft, Provider Provisioned VPN Working Group.
Ould-Brahim et al, "Using BGP as an Auto-Discovery Mechanism for Provider-provisioned VPNs", draft-ietf-l3vpn-bgpvpn-auto-00. txt, Jul. 2003, IETF Draft, L3VPN WG.
Andersson et al., "LDP Specification", RFC-3036, Jan. 2001, Network WG.

* cited by examiner

*Primary Examiner*—Duc Nguyen
*Assistant Examiner*—Michael T Thier
(74) *Attorney, Agent, or Firm*—Ridout & Maybee LLP

(57) ABSTRACT

Refresh and filtering mechanisms for LDP based VPLS and L2VPN solutions are disclosed. A method for improving information communication in a network is achieved by these refresh and filtering mechanisms. The network includes provider edge devices which can communicate with each other. The provider edge devices run a communications protocol. The method includes a step of using the communications protocol in providing a first of the provider edge devices with a list of layer-2 virtual private network instances to which a second of the provider edge devices belongs. Another step in the method is filtering layer-2 virtual private network information to be communicated to the second provider edge device from the first provider edge device by reference to the layer-2 virtual private network instances to which the second provider edge device belongs.

12 Claims, 4 Drawing Sheets

REFRESH AND FILTERING MECHANISMS FOR LDP BASED VPLS AND L2VPN SOLUTIONS

RELATED U.S. APPLICATION DATA

Provisional Application No. 60/514,463 filed on Oct. 24, 2003.

FIELD OF THE INVENTION

The present invention relates to refresh and filtering mechanisms for LDP based VPLS and L2VPN solutions and, in particular, modifications to LDP signaling protocol to facilitate elimination of unnecessary information in provider edge devices.

BACKGROUND OF THE INVENTION

Reference will be made in this application to layer-2. Layer-2 is sometimes called the link layer. In addition to the link layer, there are other layers including the network layer, the physical layer and the optical layer. The traditional roll of layer-2 is switching. Layer-2 services (such as frame relay, ATM, Ethernet) can be emulated over an Internet Protocol (IP) or Multi-Protocol Label Switching (MPLS) backbone by encapsulating the layer-2 Packet Data Units (PDUs) and then transmitting them over pseudo-wires.

Virtual Private LAN Service (VPLS) is an internet-based multipoint-to-multipoint Layer-2 Virtual Private Network (L2VPN). (Layer-2 virtual private network is a term known to those skilled in the art, and it is a term having broader meaning than virtual private LAN service.) With VPLS, multiple Ethernet LAN sites can be connected to each other across an MPLS backbone. To the customer, all sites that are interconnected by VPLS appear to be on the same Ethernet LAN (even though traffic travels across a service provide network).

The protocol for assigning and distributing a pseudo-wire label is called Label Distribution Protocol (LDP). LDP is discussed in detail in "RFC 3036: LDP Specification", Andersson et al. (available through http://ietf.org/), the entire contents of which are incorporated herein by reference. In RFC 3036, an LDP session is described as a session in which two LDP peers use LDP to exchange label/FEC mapping information.

There currently exists VPLS LDP (VPLS LDP is LDP within a VPLS) based solutions that do not use an auto-discovery mechanism. These solutions are characterized in that the operator needs to configure both sides of the pseudo-wire making up the VPLS service on both ends of the Provider Edge devices (PEs) where each PE has a priori knowledge of the remote PE pseudo-wire information. This is known as a double-sided provisioning model. Alternatively, each PE will signal to the remote PE the VPLS information, and if the remote PE does not have a VPLS in common with that PE it will just ignore this information.

A possible disadvantage associated with the above-mentioned methods is that a PE will allocate resources (such as memory and CPU) for VPLS information that will end up being discarded. Another possible disadvantage is that the network is congested with VPLS information that will end up being discarded. Yet another possible disadvantage is LDP sessions are established between PEs that may never have any VPLS in common.

SUMMARY OF THE INVENTION

An object of the invention is to provide improved refresh and filtering mechanisms for LDP based VPLS and L2VPN solutions.

According to a first aspect of the present invention, there is disclosed a method for improving information communication in a network, the network including provider edge devices which can communicate with each other, the provider edge devices running a communications protocol, and the method including the steps of:

(1) using the communications protocol in providing a first of the provider edge devices with a list of layer-2 virtual private network instances to which a second of the provider edge devices belongs; and (2) filtering layer-2 virtual private network information to be communicated to the second provider edge device from the first provider edge device by reference to the layer-2 virtual private network instances to which the second provider edge device belongs.

In one embodiment of this method, the communications protocol is LDP, the list is provided by an LDP message, the layer-2 virtual private network instances are VPLS instances, and the layer-2 virtual private network information is VPLS information.

According to another aspect of the invention, there is disclosed a network. The network includes a transmission path and two provider edge devices which can communicate with each other via the transmission path. The network also includes a protocol mechanism for sending messages between the provider edge devices. Some of the messages are adapted to provide information about layer-2 virtual private network instances to which particular provider edge devices belong. The network also includes means for processing the information to reduce information stored in the provider edge devices.

In one embodiment of this network, the provider edge devices include means for storing lists of members of layer-2 virtual private network instances.

According to yet another aspect of the invention, there is disclosed a method for filtering layer-2 virtual private network information to be signaled from a provider edge device to a peer, the method including the steps of:

(1) providing the provider edge device with a list of layer-2 virtual private network instances to which said peer belongs;

(2) establishing a label distribution protocol session with the peer only if the peer has at least one layer-2 virtual private network instance in common with the provider edge device; and (3) filtering outbound signaling from the provider edge device to the peer according to layer-2 virtual private network instances which the provider edge device has in common with the peer.

In one embodiment of this method, the method further includes the step of providing the provider edge device with an updated list of layer-2 virtual private network instances to which the peer belongs.

It would be desirable to provide a VPLS LDP solution in which VPLS information is only signaled to a PE that has VPLSs in common.

It would be also be desirable to provide a method for improving information communication in a network, by reducing congestion of the network with information that will end up being ignored by recipient PEs.

An advantage of the present invention includes allowing a given PE to establish an LDP session to a remote PE only if that PE has at least one VPLS in common with the remote PE.

It would be also be desirable to provide a VPLS LDP solution that when combined with BGP, can limit BGP usage to less than would otherwise be required.

Further features and advantages will become apparent from the following detailed description taken in conjunction with the accompanying drawings.

DETAILED DESCRIPTION

Figure 1:
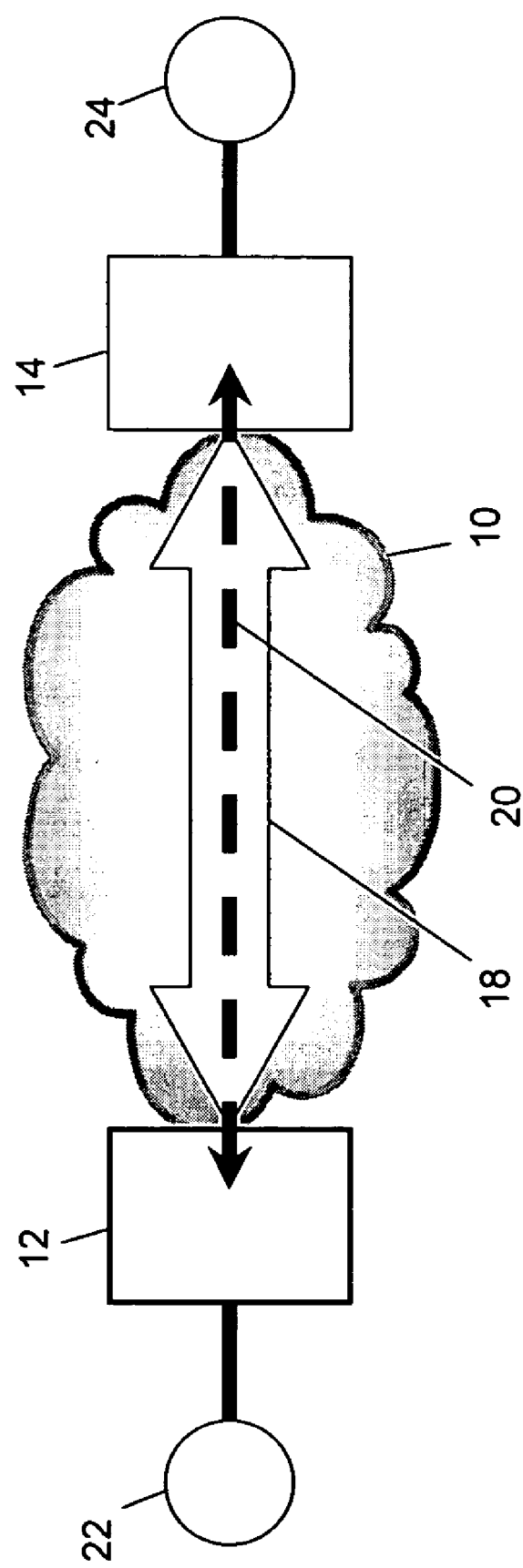
FIG. 1 is a diagram illustrating a network reference model with pseudo-wire extending between provider edge devices.

Referring to FIG. 1, there is illustrated an MPLS or IP network 10 extending between PEs 12 and 14. The PEs 12 and 14 run communication protocol(s) (e.g. LDP). With respect to the PE 12 in the context of LDP, the PE 14 can more generally be its neighbor LDP peer or its extended LDP peer. If the network 10 is an MPLS network, the PEs 12 and 14 are preferably MPLS enabled routers.

An MPLS network typically includes a Label Edge Router (LER), a Label Switch Path (LSP), and a Label Switch Router (LSR). LERs are routers on the edge of the network that attach labels to packets based on a Forwarding Equivalence Class (FEC), while LSRs are routers capable of forwarding packets according to a label switching algorithm. The PEs 12 and 14 are both LERs and LSRs when the network 10 is an MPLS network. Once packets have been assigned a label by the LER, they are forwarded along the LSP. An LSP is essentially the predetermined route that a set of packets bound to an FEC traverse though an MLPS network to reach their destination. As packets are forwarded along the LSP, each LSR makes forwarding decisions based solely on the contents of the label. At each hop, the LSR strips off the existing label and applies a new label which tell the next hop how to forward the packet.

A Packet Switch Network (PSN) tunnel 18 has been set up within the network 10. If the packets being transmitted between the devices 12 and 14 are MPLS packets, the PSN tunnel 18 is a requirement for transmission. The tunnel may not be a requirement for other pseudo-wire embodiments. The tunnel 18 can be an LSP, but other types of tunnels are known to those skilled in the art, such as an IP tunnel, a Generic Route Encapsulation (GRE) tunnel or a Secure Internet Protocol (IPSec) tunnel. An arbitrary number of pseudo-wires can be carried though a single PSN tunnel.

A pseudo-wire is a type of transmission path. For the purposes of illustration, a single pseudo-wire 20 is shown extending between the PEs 12 and 14. The PEs 12 and 14 can communicate with each other via the pseudo-wire 20. It will be appreciated by one skilled in the art that there are other types of transmission paths over a service provider network besides pseudo-wires.

A possible tunneling protocol for the tunnel 18 is Layer-2 Tunneling Protocol Version 3 (L2TPv3). L2TPv3 provides a means to interconnect transparently at high speed and at the layer-2 level, a pair of interfaces through a PSN (for instance an IPv4 based network). L2TPv3 can be used to build a multitude of layer-2 based services like VLL, layer-2 Provider Provisioned Virtual Private Network (PPVPN).

A possible signaling protocol between the PEs 12 and 14 is Label Distribution Protocol Downstream Unsolicited (LDP-DU). LDP-DU will not be used in VPLS or L2VPN using multi-hop pseudo-wire. Multi-hop pseudo-wire is described in assignee's co-pending U.S. application having Ser. No. 10/747,967 filed Dec. 29, 2003, the entire contents of which are incorporated herein by reference.

Although the refresh and filtering mechanisms disclosed in this application are particularly useful in VPLS LDP based solutions that do not use an auto-discovery mechanism, in one embodiment of the invention, an auto-discovery mechanism is also employed, and it is executed in the PEs 12 and 14. The auto-discovery mechanism permits PE learning of remote LDP targeted peer addresses. A BGP auto-discovery mechanism can be used to carry the LDP addresses. Alternatively, the targeted LDP addresses can be carried within IGP using an IGP flooding mechanism.

A Client Edge device (CE) 22 is shown in FIG. 1. The CE 22 interfaces with the network 10 via the PE 12. It will be appreciated that the CE 22 will typically be part of a client network (not illustrated). A packet to be transmitted through the network 10 is first transmitted from the CE 22 to the PE 12. In the diagram, CE 24 is diametrically opposed to the CE 22. The CE 24 interfaces with the network 10 via the PE 14.

In order for the PE 12 to discover whether it has VPNs in common with the PE 14, a new Type-Length-Value (TLV) is added to the previously described LDP/pseudo-wire signaling mechanisms. Of course the particular VPNs in common may not remain unchanged over time. Therefore in addition to initial informing, there needs to be means for a PE to refresh and update the list of VPLSs to LDP peers.

An embodiment of the invention includes adding a TLV to VPLS LDP signaling procedures. More specifically, the VPLS TLV is added to two LDP messages: 1) LDP hello message, and 2) LDP notification message. The VPLS TLV is defined as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|        VPLS TLV         |              Length              |
+-+-+-+-+-+-+-+-+-+-+-+-+-+-+-+-+-+-+-+-+-+-+-+-+-+-+-+-+-+-+-+-+
|     Length    |        Attachment Group Identifier 1           |
+-+-+-+-+-+-+-+-+-+-+-+-+-+-+-+-+-+-+-+-+-+-+-+-+-+-+-+-+-+-+-+-+
|     Length    |        Attachment Group Identifier 2 . . .     |
+-+-+-+-+-+-+-+-+-+-+-+-+-+-+-+-+-+-+-+-+-+-+-+-+-+-+-+-+-+-+-+-+
|     Length    |        Attachment Group Identifier n           |
+-+-+-+-+-+-+-+-+-+-+-+-+-+-+-+-+-+-+-+-+-+-+-+-+-+-+-+-+-+-+-+-+
```

Figure 2:
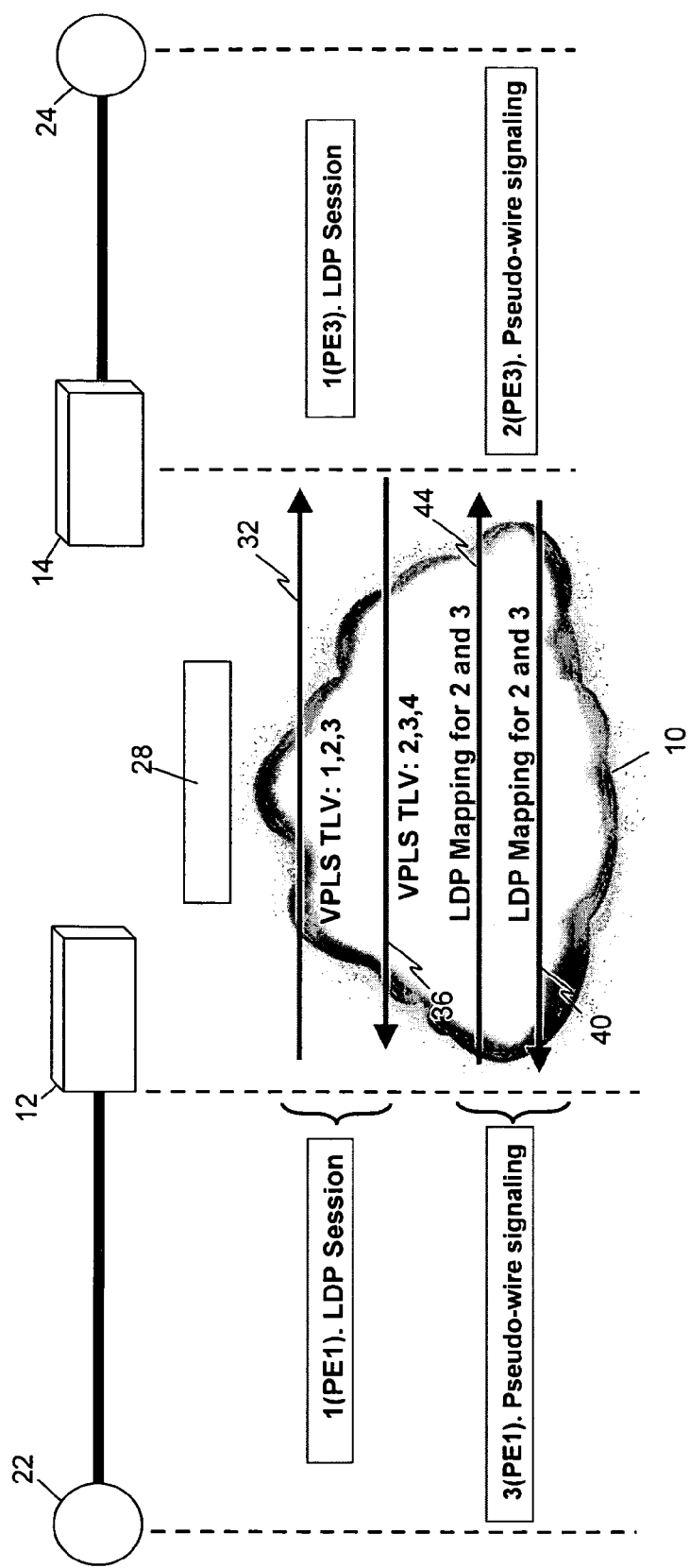
FIG. 2 is a diagram similar to FIG. 1, but depicting protocol and signal communication according to an embodiment of the invention.

In FIG. 2, an LDP session has been established between the PE 12 and the PE 14. LDP hello message 28 carriers a VPLS TLV for informing the PE 14 of a list of VPLSs configured to the PE 12. As an example, the list of VPLSs configured on the PE 12 includes VPLS1, VPLS2 and VPLS3. In other words, VPLS1, VPLS2 and VPLS3 are the three VPLS instances for the PE 12. The list of VPLSs configured on the PE 12 is communicated to the PE 14. Arrow 32 illustrates this communication. Similarly, a list of VPLSs configured on the PE 14 is communicated to the PE 12. This communication is illustrated by arrow 36. The list of VPLSs configured on the PE 14 includes VPLS2, VPLS3 and VPLS4. In other words, VPLS2, VPLS3 and VPLS4 are the three VPLS instances for the PE 14.

In an embodiment of the invention incorporating an extended discovery mechanism as described in RFC 3036, the hello message 28 is sent to a specific address rather than "all routers" group multi-cast address for an outgoing interface. Upon receiving the hello message 28 with this targeted TLV, the PE 14 establishes an LDP session and filters its outbound VPLS pseudo-wire signaling according to the set of VPLSs it has in common with the PE 12. The filtering of VPLS information to be communicated to the PE 12 from the PE 14 is achieved by reference to the VPLS instances to which the PE 12 belongs, and by reference to the VPLS instances to which the PE 14 belongs.

Additional communication arrows 40 and 44 are illustrated in FIG. 2. The arrows 40 and 44 indicate that LDP label mappings of the two VPLSs in common (VPLS2 and VPLS3) are communicated via pseudo-wire signaling from both the PE 12 to the PE 14, and from the PE 14 to the PE 12.

Using a hello message to transmit the VPLS TLV allows a PE receiving the hello message to know whether it needs to establish an LDP session with a particular remote PE. More specifically, when a PE receives the VPLS TLV and notices that it has no VPLS in common with the particular remote PE, the PE can decide not to establish an LDP session to that PE for the purpose of VPLS signaling. If the LDP session is not established, then VPLS information is not signaled to that PE. This configuration prevents overloading PEs with non-required VPLS information.

With respect to the hello message 28, this message has a u-bit (also known as Unknown TLV bit) which is set to one. By setting the u-bit to one, a PE that does not understand the VPLS TLV can just ignore the TLV and reverse to existing behavior (i.e. backward compatibility). Also it may happen that a given PE is configured with a large number of VPLSs. In that case, the hello message may become overloaded. It will be appreciated by one skilled in the art that by using membership ranges, bit sets, etc. the problem can be rectified.

It will further be appreciated that one or more of the PEs 12 and 14 can include alternative processing means such that all information is extracted from the received VPLS TLV even though there are no VPLS instances in common with the remote PE. The information matrix which is stored in the PE contains the list of VPLS members and the corresponding LDP session addresses. In the situation where the PE is configured with a new VPLS, the PE will use the information matrix to locate the set of PEs it needs to establish a targeted LDP session with.

Figure 3:
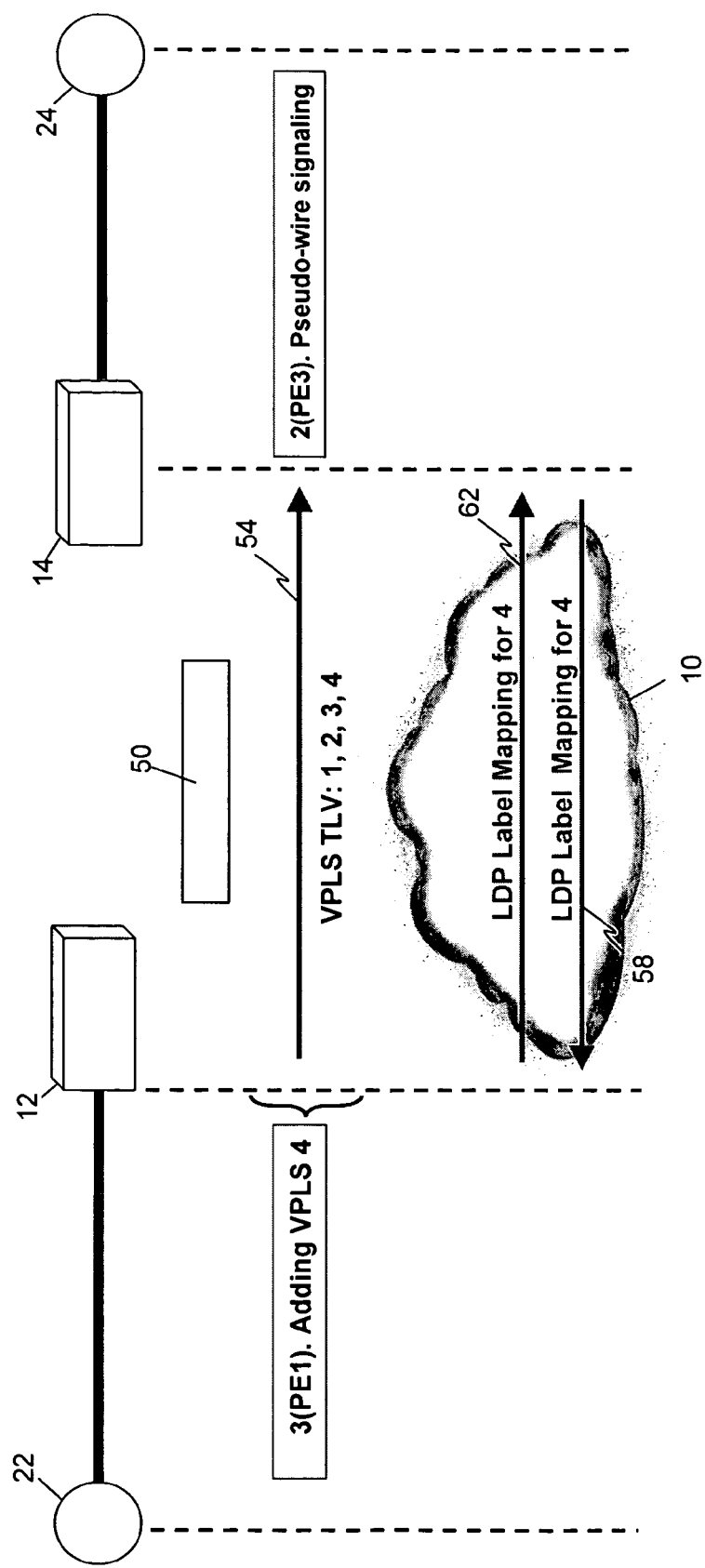
FIG. 3 is a diagram which again depicts protocol and signal communication in accordance with an embodiment of the invention.

In FIG. 3, VPLS4 has been added to the VPLS list of the PE 12. A notification message 50 communicates the updated VPLS list of the PE 12 to the PE 14. This communication is illustrated by the arrow 54. It will be recalled that VPLS4 is in the VPLS list for the PE 14. Therefore, unlike before, VPLS4 is now a VPLS which the PEs 12 and 14 have in common. Accordingly, LDP label mapping for VPLS4 is communicated from both the PE 12 to the PE 14 (arrow 58), and from the PE 14 to the PE 12 (arrow 62).

The LDP notification message 50 contains not only a new AGI corresponding to the new VPLS, but also a refresh of the VPLS TLV. It will be appreciated that the PE 14 will screen the received VPLS TLV. It will then note any new changes and establish a VPLS pseudo-wire for the new VPLS.

Figure 4:
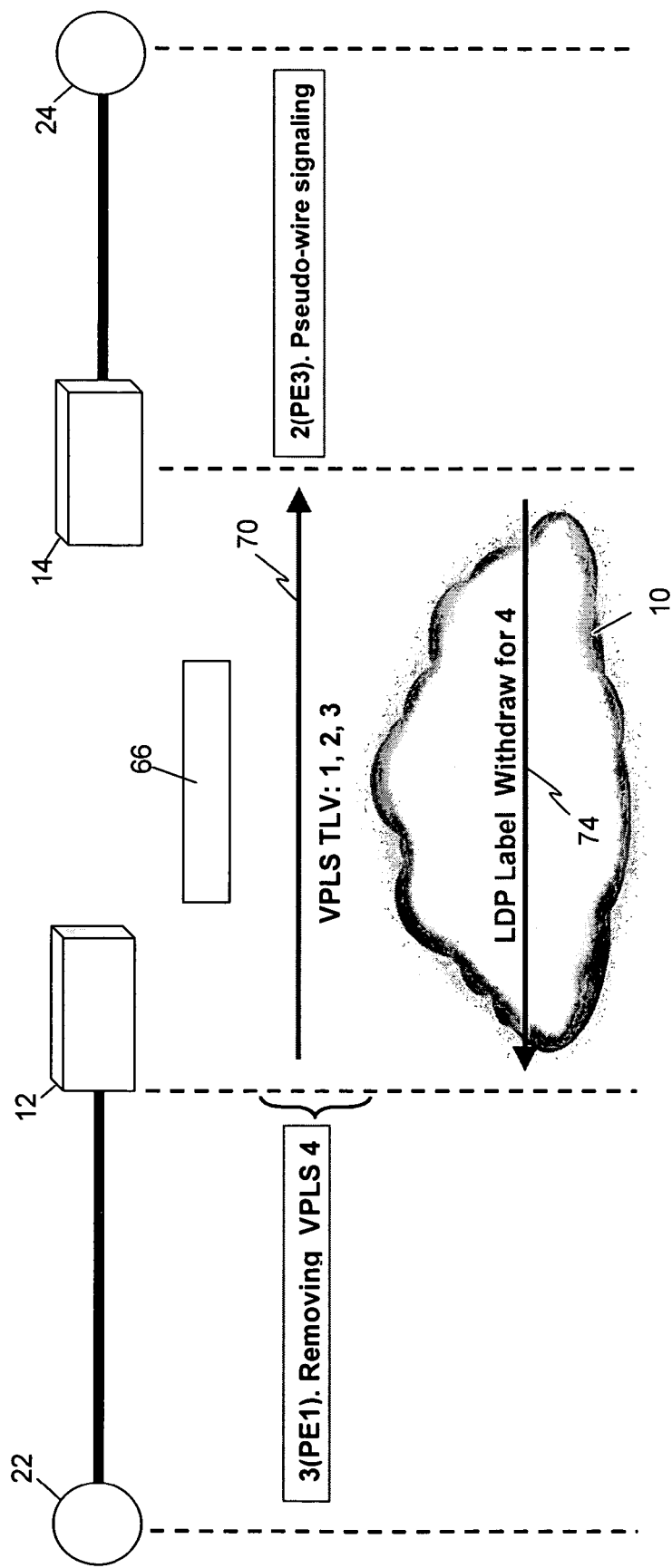
FIG. 4 is a diagram yet again depicting protocol and signal communication according to an embodiment of the invention.

In FIG. 4, VPLS4 has been removed from the VPLS list for the PE 12. VPLS4 having been removed, the PE 12 will send to all relevant PEs a refresh of the VPLS TLV and an LDP notification message that does not contain VPLS4's AGI. In the illustrated embodiment, the PE 12 sends LDP notification message 66 to the PE 14. Arrow 70 illustrates the direction of communication of the notification message 66. Subsequently, an LDP label withdraw message for the VPLS4 is communicated from the PE 14 to the PE 12 (arrow 74).

It may be that when the PE 14 has screened the received VPLS TLV, the PE 14 notes that VPLS that was already established is potentially terminated because it no longer appears in the VPLS TLV. In this case, the PE 14 will no longer send label mapping messages for that VPLS to the PE 12. Nevertheless, a non-presence of a given VPLS in the VPLS TLV (that was already present before) does not indicate to a receiving PE that it should terminate the pseudo-wires for that VPLS to the sending PE.

As explained, the LDP hello message permits informing a remote PE of the list of VPLSs configured on the message sending PE, and the LDP notification message permits informing a remote PE (which already has an LDP session established) of new or removed VPLSs. In an alternative embodiment, a scheme of verbs (e.g. add, remove) is used, and in that case the only VPLS AGIs present are the ones that have changed or are new. It will be appreciated by one skilled in the art that an embodiment of the invention where only LDP notification is used is possible. In that case, it is assumed full mesh LDP sessions are established.

In LDP, there are two discovery mechanism variants. There is a basic discovery mechanism used to discover LSR neighbors that are directly connected at link level. There is also an extended discovery mechanism used to locate LSRs that are not directly connected at link level.

LDP extended discovery is important for LDP sessions between non-directly connected LSRs. To engage in LDP extended discovery, an LSR periodically sends LDP targeted hellos to a specific address. LDP targeted hellos are sent as UDP packets addressed to a "well known" LDP discovery port at the specific address. An LDP targeted hello sent by an LSR carries the LDP identifier for the label space the LSR intends to use, and possibly additional optional information.

It is understood that a PE can obtain a targeted LDP specific peer address through configuration or through a discovery mechanism. Furthermore, it will be appreciated that the LDP peer address discovery mechanisms described and referred to in this application are not limited to VPLS. A scheme similar to the one described in "IBGP Automesh", Razuk et al. (an IEFT document) can be used. For this scheme, LDP peer information is flooded using IGP. LDP Auto-discovery TLV is defined and carried within OSPF router information LSA or ISIS as a new TLV with flooding scope local to the intra area or domain wide. Optionally, the VPLS TLV can as well be carried as subTLV within the LDP auto-discovery TLV.

In an alternative design, a different auto-discovery mechanism is used. In particular, mechanisms (see IEFT document "Using BGP as an Auto-Discovery Mechanism for Provider-provisioned VPNs", Ould-Brahim et al.) for filtering signaling information to be sent to the remote PE and associated mechanisms (outbound route filtering, capability negotiation, etc.) are provided.

GLOSSARY OF ACRONYMS USED

AGI—Attachment Group Identifier
CE—Client Edge Device
FEC—Forwarding Equivalence Class
GRE—Generic Routing Encapsulation
IP—Internet Protocol
IPSec—Secure Internet Protocol
L2VPN—Layer-2 Virtual Private Network L2TPv3—Layer-2 Tunnelling Protocol Version 3
LDP—Label Distribution Protocol
LDP-DU—Label Distribution Protocol Downstream Unsolicited
LER—Label Edge Router
LSP—Label Switch Path
LSR—Label Switch Router
MPLS—Multi-Protocol Label Switching
PDU—Packet Data Unit
PE—Provider Edge Device
PPVPN—Provider Provisioned Virtual Private Network
PSN—Packet Switched Network
TLV—Type-Length-Value
VPLS—Virtual Private LAN Service Numerous modifications, variations and adaptations may be made to the particular embodiments of the invention described above without departing from the scope of the invention, which is defined in the claims.

What is claimed is:

1. A method for improving information communication in a network, said network including provider edge devices which can communicate with each other, said provider edge devices running a communications protocol, and said method comprising, at a first of said provider edge devices:
    receiving, using said communications protocol, a list of layer-2 virtual private network instances to which a second of said provider edge devices belongs;
    determining whether layer-2 virtual private network information that is to be communicated to said second provider edge device relates to a layer-2 virtual private network instance to which said second provider edge device belongs by reference to the list of layer-2 virtual private network instances to which said second provider edge device belongs; and
    transmitting said layer-2 virtual private network information only if said layer-2 virtual private network information relates to a layer-2 virtual private network instance to which said second provider edge device belongs.

2. The method of claim 1 wherein said communications protocol is LDP, and said list is received in an LDP message.

3. The method of claim 2 further comprising determining whether to establish an LDP session with said second provider edge device, said determining whether to establish occurring after said receiving and before said determining whether layer-2 virtual private network information relates to a layer-2 virtual private network instance to which said second provider edge device belongs.

4. A method as claimed in claim 2 wherein said layer-2 virtual private network instances are VPLS instances, and said layer-2 virtual private network information is VPLS information.

5. A method as claimed in claim 3 further comprising running an auto-discovery mechanism in said first provider edge device, wherein said auto-discovery mechanism permits said first provider edge device to learn one or more peer addresses.

6. The method of claim 2 further comprising transmitting, to said second provider edge device, label mapping messages for layer-2 virtual private network instances which said first provider edge device has in common with said second provider edge device.

7. A method as claimed in claim 3 further comprising running an IGP flooding mechanism in said first provider edge device, wherein said IGP flooding mechanism permits said first provider edge device to discover one or more peer addresses.

8. A first provider edge device adapted to:
    generate a first list, said first list identifying a plurality of layer-2 virtual private network instances to which said first provider edge device belongs;
    transmit a first label distribution protocol (LDP) message to a second provider edge device, said first LDP message including said first list;
    receive a second LDP message from said second provider edge device, said second LDP message including a second list, said second list identifying a plurality of layer-2 virtual private network instances to which said second provider edge device belongs;
    determine a subset of layer-2 virtual private network instances that are in said first list and in said second list; and
    transmit, to said second provider edge device, a label mapping message for a layer-2 virtual private network instance in said subset.

9. The first provider edge device of claim 8 wherein said LDP messages include LDP hello messages and LDP notification messages.

10. The first provider edge device of claim 9 wherein said layer-2 virtual private network instances are Virtual Private Local Area Network Service instances.

11. The first provider edge device of claim 8 comprising means for storing said first list and said second list.

12. The first provider edge device of claim 11 further adapted to execute an auto-discovery mechanism for learning addresses.

* * * * *